Patented July 24, 1923.

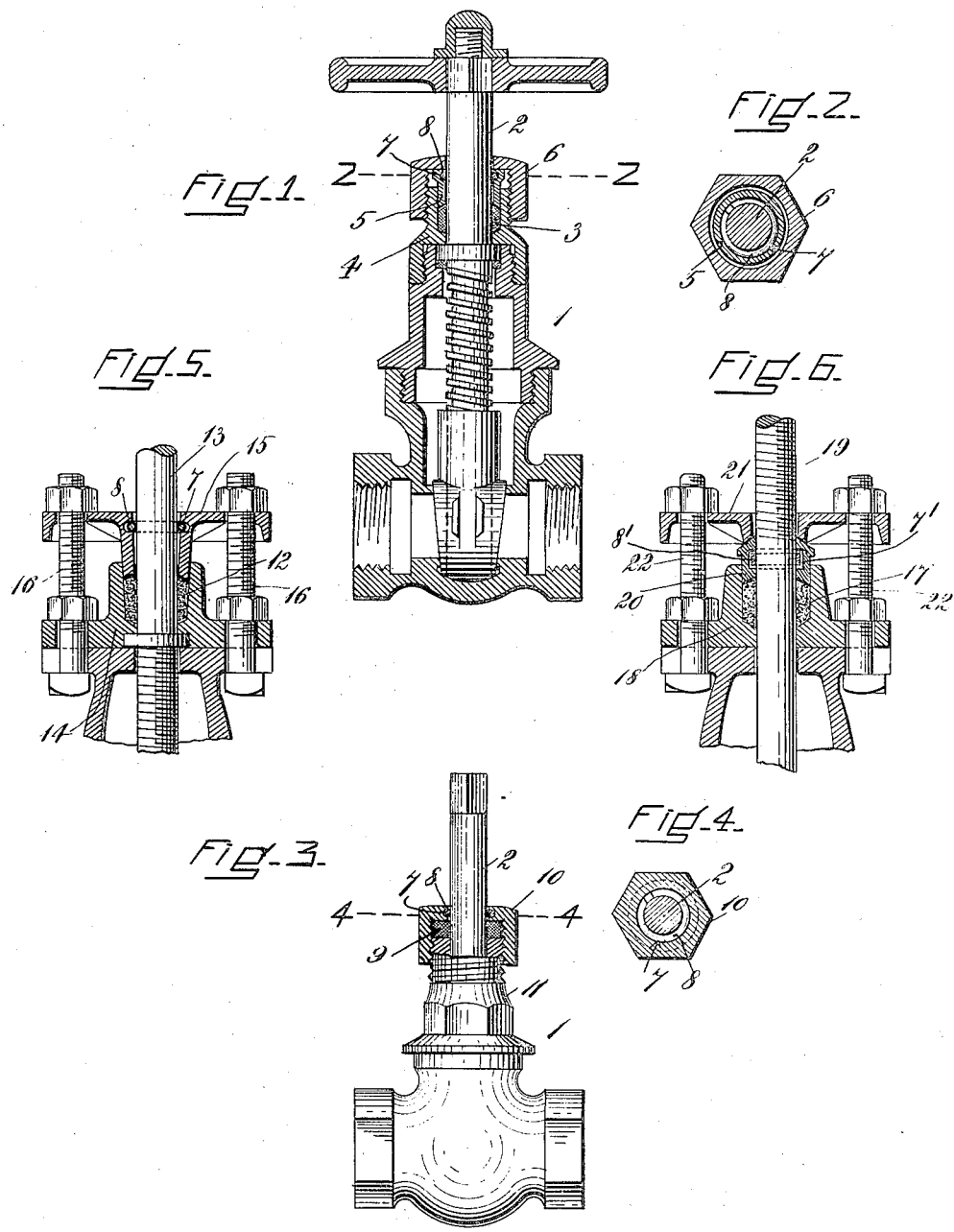

1,462,834

UNITED STATES PATENT OFFICE.

ALFRED STENWALL, OF KEWANEE, ILLINOIS, ASSIGNOR TO WALWORTH MANUFACTURING COMPANY, OF BOSTON, MASSACHUSETTS. A CORPORATION OF MASSACHUSETTS.

VALVE.

Application filed July 3, 1922. Serial No. 572,691.

*To all whom it may concern:*

Be it known that I, ALFRED STENWALL, of Kewanee, in the county of Henry and State of Illinois, a citizen of the United States, have invented a new and useful Improvement in Valves, of which the following is a full, clear, and exact description, reference being had to the accompanying drawings, forming a part of this specification, in explaining its nature.

The present invention relates to an improvement in a valve having a valve stem, packing around the stem and a member in the nature of a packing nut or follower for holding the packing in place. The packing-retaining member is movable along the stem into an out-of-the-way position, and during the packing of the valve the practice has been to manually hold the member in such position, which is a matter of inconvenience and interferes with careful packing of the valve.

The object of the invention is to obviate the difficulty above pointed out and provide self-acting means which will permit of the packing-retaining member being moved to an out-of-the-way position on the valve stem and there retained during the packing of the valve and afterward be moved into its engaging position.

The invention can best be seen and understood by reference to the drawings in which there are shown valves having different types of packing-retaining members fitted with the invention, and in which—

Figure 1 is a vertical section of a valve having one type of packing-retaining member so fitted.

Fig. 2 is a section on the line 2—2 of Fig. 1.

Fig. 3 is a valve having another type of packing-retaining member, and

Fig. 4 is a section on the line 4—4 of Fig. 3.

Fig. 5 is a vertical section of another type of valve fitted with the improvement constituting the invention, and Fig. 6 is a vertical section of a still further type of valve so fitted.

Referring to the drawings:—

1 represents the valve having a valve stem 2 and around the valve stem a packing 3. The packing is contained within a bonnet extension 4 and is retained or held in place by a follower 5 backed by a gland 6 which has threaded connection with the bonnet extension, the same being illustrative of a common construction.

The follower 5 on the interior thereof facing the valve stem is provided with an annular groove 7 within which is contained a spring 8 embracing the valve stem. During the packing of the valve both nut and follower are movable into an out-of-the-way position along the stem and both are maintained in such position, until manually released.

In Fig. 3 the follower is dispensed with and the packing 9 around the stem is retained by means of a gland 10 which engages a bonnet 11 forming a part of the valve structure, the packing being retained within the gland and between it and the end of the bonnet. In this construction the gland in the head or part thereof which embraces the valve stem is provided on the interior with an annular groove 7 having a spring 8 within it which embraces the valve stem, this spring permitting of a manual moving of the nut along the stem of the valve and functioning to retain the gland in an out-of-the-way position during the packing of the valve substantially the same as in the construction first described.

In Fig. 5 an arrangement commonly employed is shown in which a packing 12 around a valve stem 13 is contained within a bonnet 14 and retained by a gland 15 secured to the bonnet by bolt and nut connections 16. According to this construction the gland is provided on the interior with an annular groove 7 containing a spring 8 which embraces the valve stem and operates to retain the gland in an out-of-the-way position above the bonnet during the packing thereof.

In Fig. 6 a packing 17 contained within a bonnet 18 embraces a valve stem 19, the stem above the bonnet being threaded. The packing is retained by a follower 20 backed by a gland 21 secured to the bonnet by bolt and nut connections 22. According to this construction the follower is provided on the interior with an annular groove 7' containing a spring 8' which embraces the valve stem and functions to retain the follower and nut in a raised position on the stem during the packing of the gland. The spring 8' is made sufficiently wide to fit over the threads of the stem and not within them, thereby enabling the follower to be movable along the stem.

In fact, the improvement is adaptable to practically any packing-retaining member that can be movable into an out-of-the-way position along a stem during the packing of the part through which the stem extends and which contains the packing material.

Having thus fully described my invention, I claim and desire to secure by Letters Patent of the United States:—

1. In a valve having a valve stem, packing around the stem and a packing-retaining member movable into an out-of-the-way position on the stem during the packing of the valve, the combination therewith of means for holding said member in an out-of-the-way position on said stem during the packing of the valve.

2. In a valve having a valve stem, packing around said stem and a packing-retaining member movable into an out-of-the-way position on the stem during the packing of the valve, the combination therewith of means carried by said member for holding it in an out-of-the-way position on said stem during the packing of the valve.

3. In a valve having a valve stem, the combination of a packing around said stem and a packing-retaining member movable into an out-of-the-way position on the stem during the packing of the valve, said member having an interior groove facing the valve stem, and means within the groove functioning to hold said member in an out-of-the-way position on said valve stem during the packing of the valve.

4. In a valve having a valve stem, the combination of a packing around said stem and a packing-retaining member movable into an out-of-the-way position on the stem during the packing of the valve, said member having an annular groove on the interior thereof facing the valve stem, and a spring within said groove embracing the valve stem for the purposes specified.

ALFRED STENWALL.